A. S. Cameron,
Pump Valve,
N° 61,155. Patented Jan. 15, 1867.
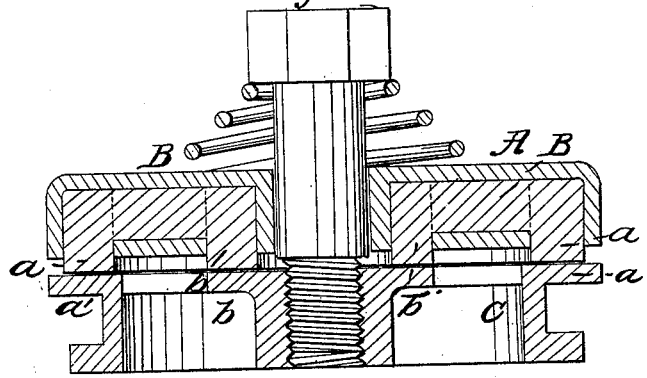
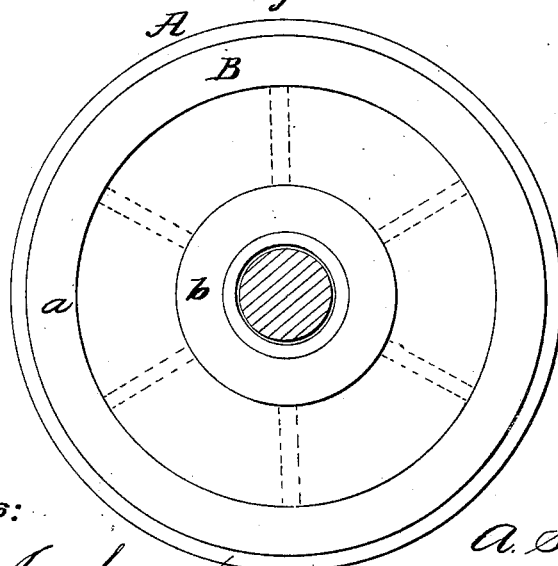
Witnesses:
F. A. Jackson
J. A. Servis
Inventor:
A. S. Cameron
Per Wmm C.
Attorneys.

United States Patent Office.

ADAM S. CAMERON, OF NEW YORK, N. Y.

Letters Patent No. 61,155, dated January 15, 1867.

IMPROVEMENT IN PUMP-VALVES.

*The Schedule referred to in these Letters Patent and making part of the same.*

TO ALL WHOM IT MAY CONCERN:

Be it known that I, A. S. CAMERON, of the city, county, and State of New York, have invented a new and improved Pump-Valve; and I do hereby declare that the following is a full, clear, and exact description thereof, which will enable others skilled in the art to make and use the same, reference being had to the accompanying drawings, forming part of this specification, in which—

Figure 1 represents a vertical central section of this invention.

Figure 2 is an inverted plan of the valve.

Similar letters of reference indicate like parts.

This invention relates to a pump-valve which is made of India rubber or other soft and elastic material, confined in a metallic case in such a manner that when the valve comes down on its seat its elastic face will freely accommodate itself to the same and close tight, and at the same time the India rubber or other soft and elastic material is confined in the metallic case so that it cannot be compressed sufficiently to allow metallic contact between the valve and its seat; and furthermore, by the metallic case the India rubber or other material is protected, and a valve is obtained which is not liable to leak, and which will not wear out or require efitting for a long time.

A represents a metallic case cast, or otherwise produced, in such a manner that it is capable to confine the India rubber or other soft and elastic material, B, which is cast or otherwise secured in the same, and which is so shaped that it forms two annular faces, $a\ b$, to correspond to similar faces, $a'\ b'$, of the seat C. The faces $a\ b$ project a short distance beyond the surface of the metallic case A, so that when the valve is brought down on its seat the rubber faces will close up tight against the faces of the seat without permitting a metallic contact. The faces of the seat are made somewhat wider than those of the valve, to prevent the rubber or other soft material from being cut, and by confining said rubber or other material in the metallic case, its faces are allowed to accommodate themselves to the faces of the seat, and yet it cannot be compressed sufficiently to allow metallic contact between the valve and the seat. A valve is thus obtained which is easily made, which requires but little fitting, and which is very durable and not liable to get out of order for a long time. In practice I form my valve by putting the gum into the case or recess in a plastic state, and vulcanizing it in the same, whereby said gum is firmly held in place, and no other fastening is required; and furthermore, by these means the gum can be brought in just the desired form, which, in many instances, would be unobtainable if the same were vulcanized previously.

Having thus described my invention, I claim as new, and desire to secure by Letters Patent—

1. A valve composed of a metallic case A, in which India rubber or other suitable material, B, is confined so as to form faces $a\ b$, to operate in combination with the seat C, substantially as and for the purpose described.

2. A valve formed by putting the rubber into the case or recess in a plastic state and vulcanizing it therein, substantially as and for the purpose specified.

ADAM S. CAMERON.

Witnesses:
 WM. F. McNAMARA,
 W. HAUFF.